United States Patent [19]
Ludwig et al.

[11] 3,980,496
[45] Sept. 14, 1976

[54] ENERGY CONVERSION DEVICES WITH IMPROVED ELECTRODE SHAPES

[75] Inventors: Frank A. Ludwig, Southfield; Robert W. Minck, Lathrup Village; Steven A. Weiner, Ypsilanti, all of Mich.

[73] Assignee: Ford Motor Company, Dearborn, Mich.

[22] Filed: Jan. 29, 1975

[21] Appl. No.: 545,048

[52] U.S. Cl. .............................. 429/103; 429/105; 429/121; 429/249; 429/165
[51] Int. Cl.² ........................................... H01M 4/00
[58] Field of Search .................................. 136/6 FS

[56] References Cited
UNITED STATES PATENTS

| | | | |
|---|---|---|---|
| 3,413,150 | 11/1968 | Kummer et al. | 136/6 FS |
| 3,756,856 | 9/1973 | Fennenhouse | 136/6 FS |
| 3,811,943 | 5/1974 | Minck | 136/6 FS |

*Primary Examiner*—John H. Mack
*Assistant Examiner*—H. A. Feeley
*Attorney, Agent, or Firm*—Roger L. May; Keith L. Zerschling

[57] ABSTRACT

An improved electrical conversion device of the type comprising: (1) an anodic reaction zone containing a molten alkali metal reactant-anode in electrical contact with an external circuit; (2) a cathodic reaction zone containing a cathodic reactant comprising a liquid electrolyte which is electrochemically reactive with said anodic reactant and an electrode of porous conductive material which is at least partially immersed in said cathodic reactant; and (3) a cation-permeable barrier to mass liquid transfer interposed between and in contact with said anodic and cathodic reaction zones, said porous conductive material being in electrical contact with both said cation-permeable barrier and an external circuit; the improvement of the invention comprising a modification of the cathodic reaction zone of the device such that there are a plurality of channels and/or spaces within the zone which are free of the porous conductive material and which in combination with said porous conductive material are adapted to allow flow within said cathodic zone of the said cathodic reactant and cathodic reaction products during operation of the device.

44 Claims, 22 Drawing Figures

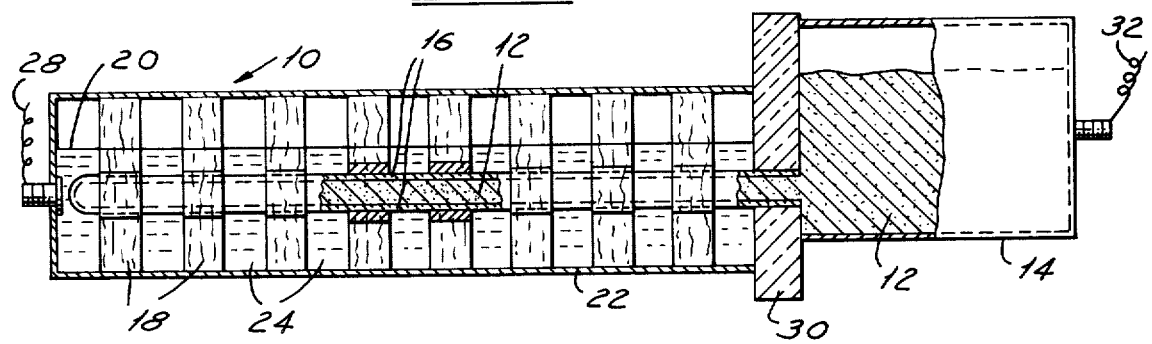
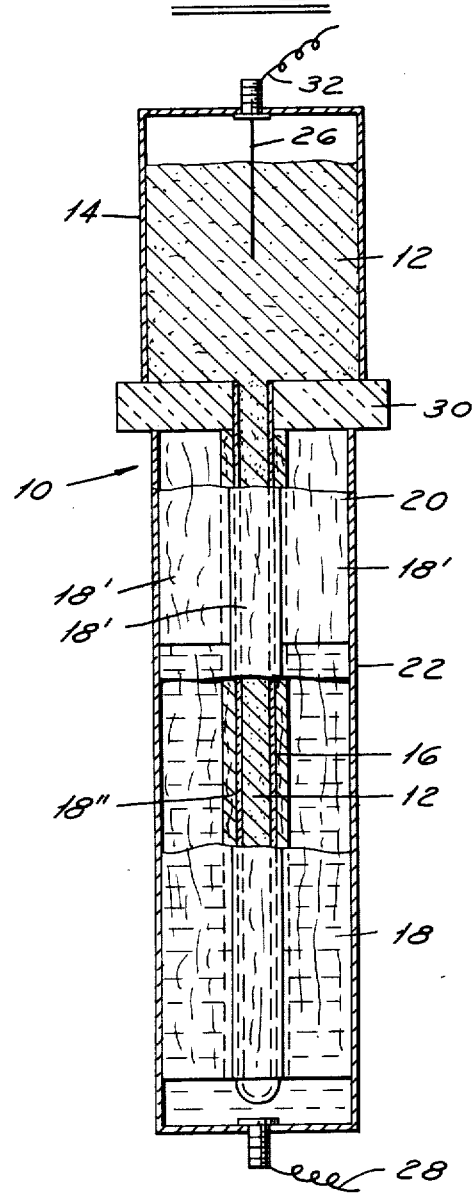

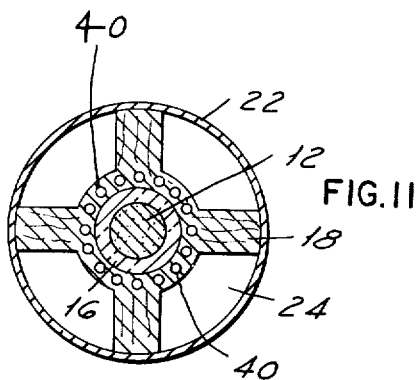
FIG. 11
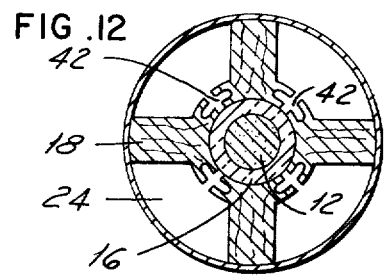
FIG. 12
FIG. 13
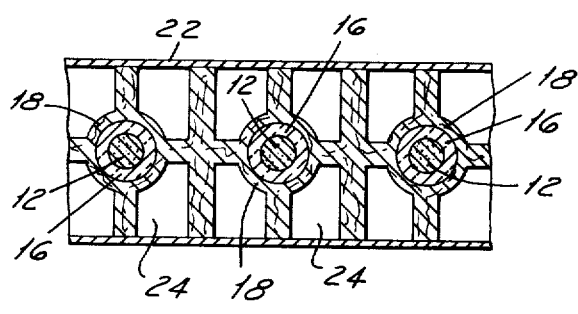
FIG. 14
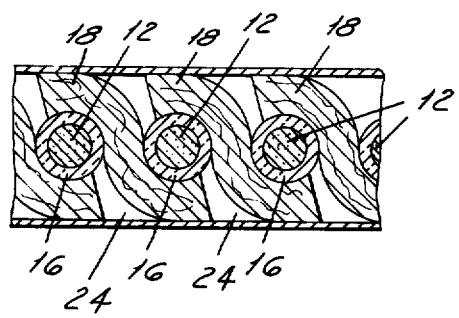
FIG. 15
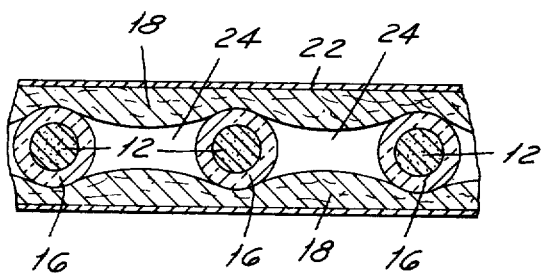
FIG. 16
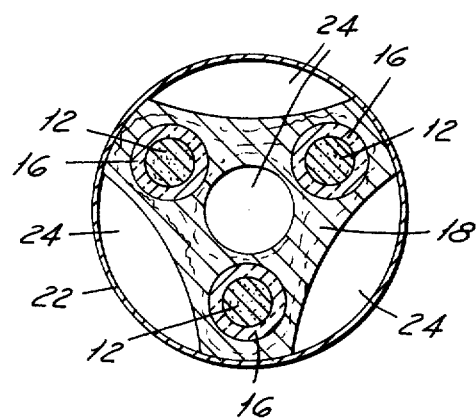

ENERGY CONVERSION DEVICES WITH IMPROVED ELECTRODE SHAPES

The invention herein described was made in the course of or under a Contract or subcontract thereunder with the National Science Foundation.

This invention relates to certain new and improved electrical conversion devices. More particularly, this invention relates to electrical conversion devices of improved design wherein a porous conductive electrode disposed within the cathodic reaction zone of the device is modified so as to promote and enhance the rate of feeding and extracting of reactants and reaction products to and from reactive sites within said cathodic reaction zone.

A recently developed class of electrical conversion devices comprises: (1) an anodic reaction zone containing a molten alkali metal anode-reactant, e.g., sodium, in electrical contact with an external circuit; (2) a cathodic reaction zone containing a cathodic reactant comprising a liquid electrolyte e.g., a mixture of molten sulfur and sodium polysulfide, which is electrochemically reactive with said anodic reactant; and (3) a solid electrolyte comprising a cation-permeable barrier to mass liquid transfer interposed between and in contact with said anodic and cathodic reaction zones. During the discharging cycle of a sodium-sulfur battery which exemplifies the devices improved in accordance with this invention, sodium atoms surrender an electron to an external circuit and the resulting sodium ion passes through the solid electrolyte barrier to unite with sulfur ions formed with electrons from the external circuit. Both electrons and cathodic reactant must be supplied to and distributed along the surface of the porous conductive material in the vicinity of the cation-permeable barrier or solid electrolyte. The opposite procedure occurs during the charging cycle.

An electrode structure of large surface area which is generally disposed within the cathodic reaction zone in close proximity to and in electrical contact with the solid electrolyte supplies and distributes electrons. The cathodic reactant must move readily into and out of the vicinity of this electrode structure and the solid electrolyte surface; and this is difficult because the reactants and reaction products are only slight miscible and the electrode structures employed tend to inhibit mass flow therethrough. Additionally, maximum reactants and reaction products must be maintained in contact with the maximum surface area of the solid electrolyte or reaction zone separator despite volume changes caused by ion migration.

U.S. Pat. No. 3,811,943 disclosed an energy conversion device exhibiting greatly improved mass transportation of reactants and reaction products to and from the vicinity of the solid electrolyte and electrodes. According to the patent, the invention described therein also provides maximum utilization of the area of the solid electrolyte and electrode despite the volume changes of the reactants. In the device disclosed therein an ionically conductive electrolyte is located between a first reactant in one container and a second reactant in another container, the term reactant being used to designate both reactants and reaction products. An electrode for one of the reactants comprises a layer of electronically conductive material having one surface in contact with one side of the ionically conductive electrolyte and the other surface in contact with a structurally integral, electronically conductive member permeable to mass flow of its reactant and electrically connected to the external circuit. An open volume exists between the structurally integral conductive member and the container wall to promote free flow and mixing of the reactant. Reactant also flows readily through the conductive member into the layer of electronically conductive material. The conductive member distributes electrons to the conductive material which in turn transfers electrons to or from the reactants.

Whie energy conversion devices employing structurally integral conductive members disposed in the manner described in the patent do substantially increase flow and mixing of reactants as well as transfer of electrons within the cell, it was believed that still further improvement in the rate of feeding and extracting of reactants while employing more electrode area could be obtained by still further improved cell designs.

BRIEF DESCRIPTION OF THE INVENTION

The improved electrical conversion devices designed in accordance with this invention provide still further enhancing of the rate of feeding and extracting of reactants and reaction products to and from regions near the surface of said solid electrolyte or reaction zone separator. The electrical conversion device structures in accordance with this invention also provides for usage of more electrode area and thereby result in higher cell voltage efficiency by providing better and more extensive solid electrolyte to liquid electrolyte to electrode contacts. Finally, these structures provide for a reduction in weight of the cell and simplify its assembly by eliminating the need for the structurally integral, electronically conductive member of the aforementioned patent.

Briefly the invention sought to be claimed herein comprises an improvement in electrical conversion devices which contain: (1) an anodic reaction zone containing a molten alkali metal reactant-anode in electrical contact with an external circuit; (2) a cathodic reaction zone containing a cathodic reactant comprising a liquid electrolyte which is electrochemically reactable with said anodic reactant and an electrode of porous conductive material which is at least partially immersed in said cathodic reactant; and (3) a solid electrolyte which is a cation-permeable barrier to mass liquid transfer and which acts as a reaction zone separator between said anodic and cathodic reaction zones, said porous conductive material being in electrical contact with both said cation-permeable barrier and said external circuit, the improvement of the invention comprising designing the cathodic reaction zone such that there are a plurality of channels and/or spaces within said zone which are free of the porous conductive material or electrode and which are thus adapted to allow for free flow of the cathodic reactant and cathodic reaction products during operation of the device. Most generally, the porous conductive material or electrode will be in physical contact with both the solid electrolyte or reaction zone separator and the container wall surrounding the cathodic reaction zone. More particularly, the porous conductive material or electrode has a large surface area and substantially fills the entire cathodic reaction zone with the exception of such channels and/or spaces through which the cathodic reaction products and cathodic reactant may freely flow.

The improved designs of the cathodic reaction zone in accordance with the invention are particularly suitable for electrical conversion devices comprising: (1) a tubular container which is in electrical contact with an external electrical circuit; (2) a tubular cation-permeable barrier to mass liquid transfer which is disposed within said tubular container so as to create an anodic reaction zone within said tubular barrier and a cathodic reaction zone between said tubular barrier and said tubular container; (3) a molten alkali metal anodic reactant within said anodic reaction zone in electrical contact with said external electrical circuit; (4) a cathodic reactant comprising a liquid electrolyte which is electrochemically reactive with said anodic reactant and which is disposed within said cathodic reaction zone; and (5) an electrode of porous conductive material which is disposed within said cathodic reaction zone, immersed at least in part in the cathodic reactant and is in both electrical and physical contact with both the tubular barrier and the container. Such tubular or cylindrical electrical conversion devices made in accordance with this invention thus comprise a cathodic reaction zone which completely surrounds the solid electrolyte or reaction zone separator. The porous conductive material or cathodic electrode substantially fills the entire space between the inner solid electrolyte tube and the outer container tube except for the channels and/or spaces which promote convective flow of the cathodic reactants and reaction zone products. This flow results from free convection within said channels and/or spaces, and from wicking of cathodic reactants or cathodic reaction products within the conductive porous material. Flow in the channels is mainly the result of free convection forces, but if the cells are oriented so as to decrease free convection, flow in the channels still occurs in response to wicking forces.

The invention will be more fully understood after reading the following detailed description of the invention in conjunction with the drawings in which:

FIGS. 1 and 2 show vertical section views of electrical conversion devices in accordance with the invention.

FIGS. 3–12 are horizontal cross-sections of tubular electrical conversion devices in accordance with the invention;

FIG. 13–17 are horizontal cross-sections of devices in accordance with the invention, but including multiple anodic reaction zones;

DETAILED DESCRIPTION OF THE INVENTION

Figure 3:
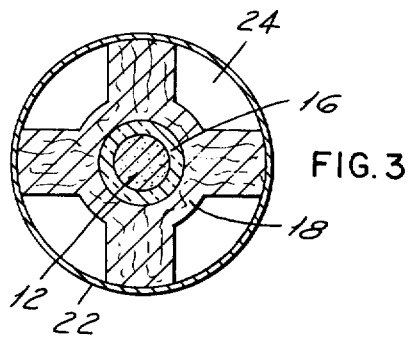

The electrical conversion devices to which the improvement of this invention applies and various components thereof are disclosed in the following U.S. Pat. Nos., the disclosures of which are incorporated herein by reference: 3,404,035; 3,404,036; 3,413,150; 3,446,677; 3,458,356; 3,468,709; 3,468,719; 3,475,220; 3,475,223; 3,475,225; 3,535,163 and 3,719,531.

As mentioned above, the electrical conversion devices to which this invention applies comprise generally: (1) an anodic reaction zone containing a molten alkali metal reactant anode in electrical contact with an external circuit; (2) a cathodic reaction zone containing a cathodic reactant comprising a liquid electrolyte which is electrochemically reactive with said anodic reactant and an electrode of porous conductive material which is at least partially immersed in said cathodic reactant; and (3) a cation-permeable barrier to mass liquid transfer interposed between and in contact with said anodic and cathodic reaction zones, said porous conductive material being in electrical contact with both said cation-permeable barrier and the external circuit.

The anodic reactant or reductant employed in such devices is an alkali metal which is maintained above its melting point when the device is in operation. The anodic reactant is heated by any conventional means including, but not by way of limitation, induction heating by electrical means, indirect heat exchange with a suitable heated fluid heat exchange means, or by direct heating. The anodic reactant may also be viewed as the anode proper or conductor through which electron flow to the external circuit is achieved. A cell component of this type is conventionally referred to in the art as a sacrificial electrode in that while it is serving the role of a conductor, it is also undergoing electrochemical reaction. Molten sodium is employed as the anodic reactant in most preferred embodiments of such devices. However, potassium, lithium, other alkali metals, mixtures of such alkali metals, or alloys containing such alkali metals can be used if the cathodic reactant and the cation-permeable barrier or separator are chosen from compatible materials.

In all embodiments of the invention the cathodic reactant is a material which is a liquid electrolyte and which is electrochemically reactive with the anodic reactant. In the secondary battery embodiments, which are discussed herein by way of example, the cathodic reactant is a material which is electrochemically reversibly reactive with the anodic reactant. The cathodic reactant or oxidant is likewise employed in a molten state and is preferably a material which will undergo all phases of the aforementioned reversible reaction with all components thereof remaining for the most part in a liquid state. The cathodic reactant advantageously comprises a metal salt and preferably a sulfide of the metal employed as the anodic reactant. Thus, where the anodic reactant is sodium, the cathodic reactant preferably contains sodium and sulfur. In a particularly preferred embodiment of such a secondary battery, the discharge cycle is initiated with a mole ratio of about 3:2 of sulfur to sodium and the discharge operation is terminated when the reaction product attains the atomic ratio of sulfur to sodium of about 3:2. The alkali metal concentration in the cathodic reactant controls the degree of ionic conduction therethrough. The relative concentrations of sodium and sulfur determine the melting points of the cathodic reactants. This ratio must, therefore, be considered in relation to the operating temperature of the cell and vice versa.

The anodic reactant is separated from the cathodic reactant by a solid barrier to mass liquid transfer that is selectively conductive with respect to cations of the anodic reactant and substantially impermeable to other ions which may be formed in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes when the device is in operation. It is preferred that the separator be as thin as possible without unduly sacrificing strength. Although optimum thickness may vary with the intended use, separators having a thickness in the range of about 20 to about 2,000, preferably about 100 to about 1,000, microns have been found to be effective.

Both glasses and polycrystalline ceramic materials have been found suitable for use in certain of such electrical conversion devices as the solid electrolyte or reaction zone separator. Among the glasses which may be used with such devices and which demonstrate an unusually high resistance to attack by molten alkali metal are those having the following compositions: (1) between about 47 and about 58 mole percent sodium oxide, about 0 to about 15, preferably about 3 to about 12, mole percent aluminum oxide and about 34 to about 50 mole percent of silicon dioxide; and (2) about 35 to about 65, preferably about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listesd ingredients and firing at temperatures of about 2700°F.

The polycrystalline ceramic materials useful as reaction zone separators or solid electrolytes are bi- or multi-metal oxides. Among the polycrystalline bi- or multi-metal oxides most useful for use in electrical conversion devices to which this invention applies are those in the family of beta-aluminas, all of which exhibit a generic crystalline structure which is readily identifiable by X-ray diffraction. Thus, beta-type-alumina or sodium beta-type-alumina is a material which may be thought of as a series of layers of aluminum oxide held apart by columns of linear Al—0 bond chains with sodium ions occupying sites between the aforementioned layers and columns. Among the numerous polycrystalline beta-type-alumina materials useful as reaction zone separators or solid electrolytes are the following:

1. Standard beta-type-alumina which exhibits the above-discussed crystalline structure comprising a series of layers of aluminum oxide held apart by layers of linear Al—0 bond chains with sodium ions occupying sites between the aforementioned layers and columns. Beta-type-alumina is formed from compositions comprising at least about 80 percent by weight, preferably at least about 85 percent by weight of aluminum oxide and between about 5 and about 15 weight percent, preferably between about 8 and about 11 weight percent, of sodium oxide. There are two well known crystalline forms of beta-type-alumina, both of which demonstrate the generic beta-type-alumina crystalline structure discussed hereinbefore and both of which can easily be identified by their own characteristic X-ray diffraction pattern. Beta-alumina is one crystalline form which may be represented by the formula $Na_2O \cdot 11Al_2O_3$. The second crystalline form is beta''-alumina which may be represented by the formula $Na_2O \cdot 6Al_2O_3$. It will be noted that the beta'' crystalline form of beta-type-alumina contains approximately twice as much soda (sodium oxide) per unit weight of material as does the beta-alumina. It is the beta''-alumina crystalline structure which is preferred for the formation of solid electrolytes or reaction zone separators for electrical conversion devices. In fact, if the less desirable beta form is present in appreciable quantities in the final ceramic, certain electrical properties of the body will be impaired.

2. Boron oxide $B_2O_3$ modified beta-type-alumina wherein about 0.1 to about 1 weight percent of boron oxide is added to the composition.

3. Substituted beta-alumina wherein the sodium ions of the compositions are replaced in part or in whole with other positive ions which are preferably alkali metal ions.

4. Beta-type-alumina which is modified by the addition of a minor proportion by weight of metal ions having a valence not greater than two such that the modified beta-type-alumina composition comprises a major proportion by weight of ions of aluminum and oxygen and a minor proportion by weight of a metal ion in crystal lattice combination along with cations which migrate in relation to the crystal lattice as a result of an electric field, the preferred embodiment for use in such electrical conversion devices being wherein the metal ion having a valence not greater than 2 is either lithium or magnesium or a combination of lithium and magnesium. These metals may be included in the composition in the form of lithium oxide or magnesium oxide or mixtures thereof in amounts ranging from 0.1 to about 5 weight percent, preferably from about 0.1 to about 1.5 weight percent.

The cathodic electrode or porous conductive material is in electrical contact, and preferably in physical contact, with both the cation-permeable barrier or solid electrolyte and the container in which the electrical conversion device is housed. This conductive material is of significantly greater surface area than a solid cathode and may comprise any porous material which is electronically conductive and which is resistant to attack by reactants within the cathodic reaction zone. Among the many such materials which may be employed are felts or graphite or stainless steel, rigidized graphite felts and porous graphite foam.

As discussed above, the improvement of this invention over prior art electrical conversion devices involves disposing the porous conductive material or cathodic electrode within the cathodic reaction zone in such a form or shape that channels and/or spaces are created so as to allow free flow therethrough of cathodic reactants and cathodic reaction products during operation of the electrical conversion device. The various possible shapes and the disposition of such porous conductive material within the cathodic reaction zone will become more apparent from the more detailed description of the invention which follows hereinafter.

FIGS. 1 and 2 show sectional views of two different embodiments of electrical conversion devices constructed in accordance with the invention, with the cell of FIG. 1 being horizontally disposed and demonstrating one type of electrode configuration while the cell of FIG. 2 is vertically disposed and shows a second type of electrode configuration within the scope of the invention. In the figures there is shown a cell which is generally indicated as 10 and which may be one unit of a plurality of cells in series and/or parallel forming a battery. In each of the cells shown an anode-reactant e.g., molten sodium, 12 is shown within a reservoir 14 and within a tube 16 formed of a solid electrolyte which is a cationically conductive barrier to mass liquid transfer, e.g., beta''-alumina containing ceramic. In contact with the exterior surface of tube 16 of each cell is one or more porous conductors 18 formed from a porous material which is resistant to attack by cathodic reactant 20, a liquid electrolyte which is electrochemically reactive with anodic reactant 12 and which is disposed within the space between the exterior of tube 16 and the interior of container 22.

Figure 18:
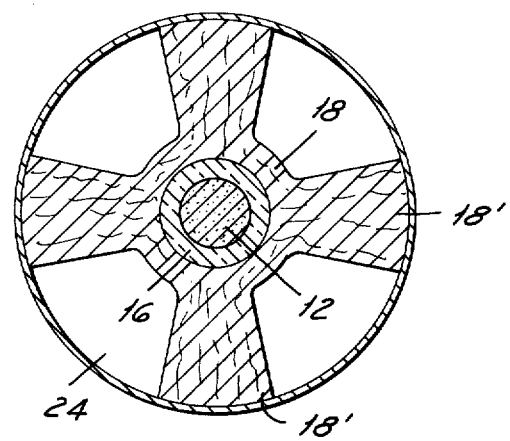
FIGS. 18 and 19 show vertical and horizontal cross-sections of still another design in accordance with the invention.
Figure 19:
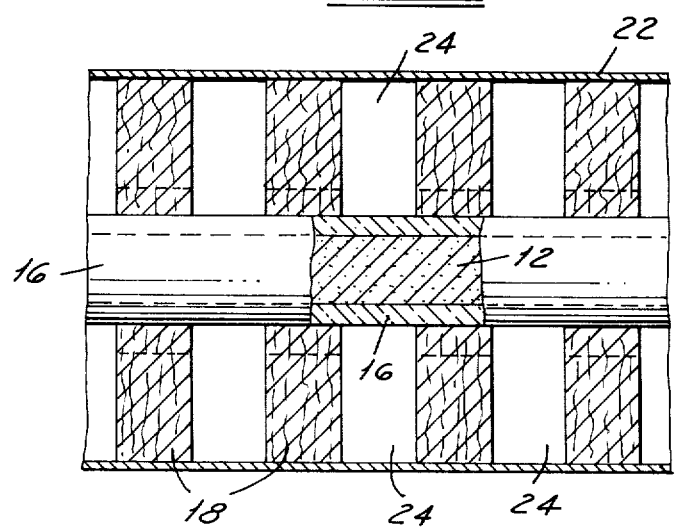

Reference to FIG. 1 will indicate that a plurality of porous conductors 18 are disposed in an annular relationship around said tube 16, being of sufficient size to at least partially contact the interior surface of container 22. channels or spaces 24 comprising those areas within the cathodic reaction zone between said tube 16 and container 22 which are not filled with porous conductor 18 serve to allow free flow of cathodic reactant 20 within cell 10 and thereby promote movement of reactants and reaction products to and from the surface of tube 16. The electrode design shown in FIG. 1 is more clearly shown in FIGS. 18 and 19 wherein FIG. 19 is a sectional view of the device similar to FIG. 1 and FIG. 18 is a cross-sectional view of the tubular device 10. As will be seen in FIG. 18, the device may comprise a plurality of porous conductive members 18 having a plurality of arms 18' connecting the center annular portion thereof with container 22. As clearly shown in FIG. 18, when such a configuration is employed channels or spaces 24 remain between the porous conductive material and the container 22.

The electrode design shown in the device of FIG. 2 is more clearly shown in FIG. 3 which will be discussed more fully hereinafter. However, as can be seen in the broken away sections of FIG. 2, porous conductive material 18 may be disposed so as to have arms 18' which are normal to the axis of tube 16 and so as to include sections 18'' continuously disposed about the surface of tube 16, but not extending to the inner surface of container 22 in certain regions. In contact with the molten alkali metal anode 12 is a conductor 26, shown in FIG. 2, which serves as the negative lead to an external circuit, not shown, which includes a resistance, e.g., a light bulb, D.C. motor, etc., and is in electrical connection with a positive lead, conductor 28. Lead 28 is in electrical contact with container 22. The cell is sealed by cover 30. The alkali metal atoms of the anode-reactant 12 yield electrons during operation of the cell to conductor 26, which electrons pass through lead 32 to an external circuit while the ions so formed pass through tube 16 to the cathodic reaction zone formed by container 22 and tubular reaction zone separator 16. Sulfur atoms within 20 accept electrons from the external circuit via porous conductor 18, thus completing the circuit.

FIGS. 3 through 22 show a variety of cell configurations including various cross-sections of tubular devices within the scope of the invention. FIGS. 3 and 4 show horizontal cross-sections of tubular devices of a first type. In this type of cell an electrode of porous conductive material is formed by cutting a porous electronic conductor such as a graphite felt 18 into the shape shown in FIG. 1 and assembling into a tubular cell comprising tube 16, container 22, anodic reactant 12 and a cathodic reactant, not shown. In operation the extended arms of the porous conductive material transmit electrons from outer container 22 to the region of the electrode near the solid electrolyte tube 16 for efficient electrode operation (since the conductivity of the electronic phase is generally much greater than that of the molten electrolyte) within the cathodic reaction zone. In experimentation with energy conversion devices of the sodium-sulfur variety it has been found that sulfur wets graphite more strongly than polysulfide wets graphite. Thus, the arms of porous conductor 18 also serve as wicks to feed and extract sulfur to and from regions near the surface of solid electrolyte 16. The open regions 24 between arms of the electrode serve to promote rapid exchange of reactants and products to the thin ring section of the porous conductor electrode by modes of mass transfer other than wicking. The longer the vertical height of these open regions within the tubular device, the greater the fluid flow by free convection. This exchange of material between the open regions 24 and the thin ring section of porous conducting electrode 18 improves utilization of reactants stored within the cell and also has the advantage of eliminating the leaky screen current collector required for the devices taught by U.S. Pat. No. 3,811,943 referred to above. Thus, the design also has the advantage of reducing cell weight and simplifying cell assembly. This type of cell design also allows some flexibility in adjusting the charge and discharge characteristics of the cell by varying dimensions of the various sections of the porous conductive materials, i.e. the arms and ring.

Figure 5:
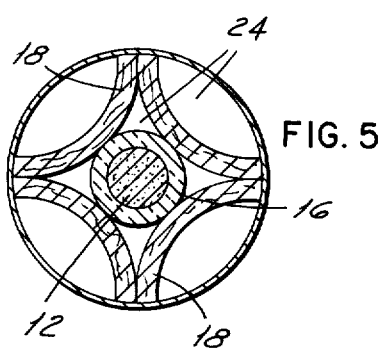
Figure 6:
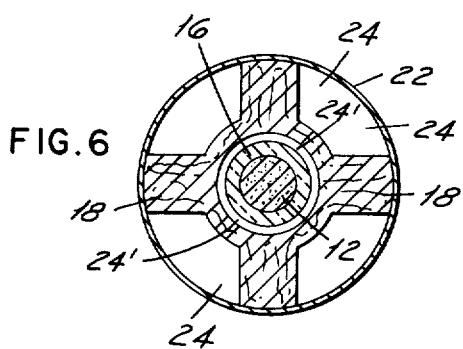

FIGS. 5 and 6 show horizontal cross-sections of tubular cells in accordance with this invention, the cells being of a second general type which is advantageous when the ratio of charging current to discharge current in a secondary battery is increased. In FIG. 5, electrode 18 is shaped in such a way as to present several channels 24 at the solid electrolyte surface 16 between regions of porous electrode 18, through which molten sulfur and salts can easily move by free convention or other fluid flow, thereby enhancing the feeding and extraction of reactants and reaction products to and from the electrode region adjacent to surface 16. In FIG. 6 the entire porous electrode 18 which may be graphite felt is located a small distance from the solid electrolyte surface 16 except for an occasional strand of protruding felt 18 which will touch the solid electrolyte 16. Thus, it will be noted that a cell having a cross-sectional configuration as in FIG. 6 will have a channel or plurality of channels 24 adjacent to the solid electrolyte surface 16 in addition to spaces or channels 24 between porous electrode 18 and container 22.

Figure 4:
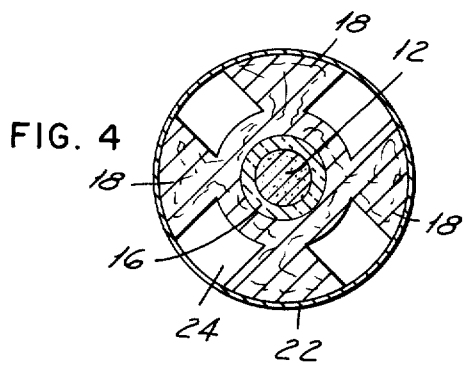

Electrical contact to the wall of the container 22 can be obtained in cells such as shown in FIGS. 3 and 4 either by slight compression fitting of the material such as felt or by cementing (preferably with a graphite cement such as "Dylon"), or by achieving a metallurgical bond such as by brazing or alloying. However, the type 2 form of cell shown in cross-section in FIG. 6 cannot be compressed and must be attached to the container wall.

Figure 7:
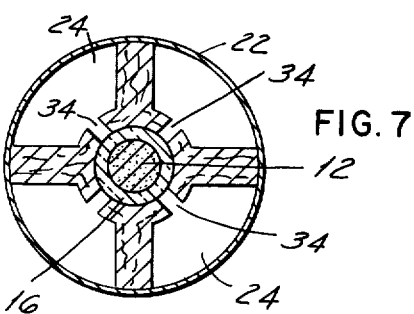
Figure 8:
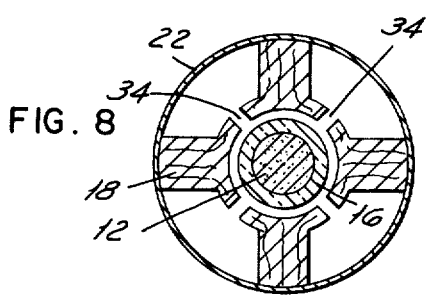
Figure 9:
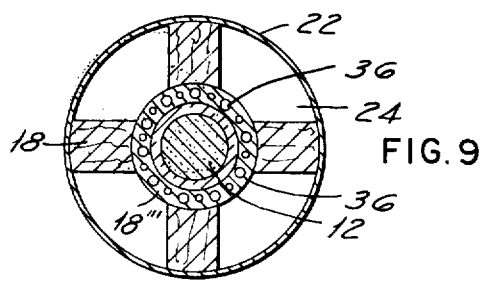
Figure 10:
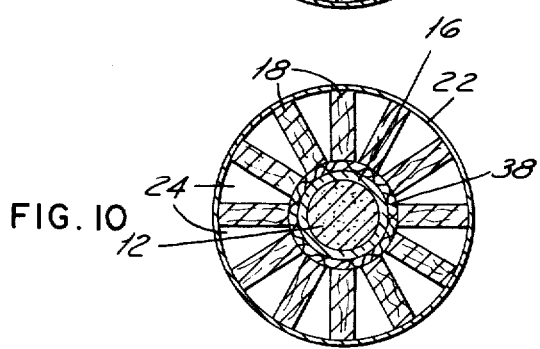

FIGS. 7 through 10 show horizontal cross-sections of a third type of tubular cell. Cells having cross-sections similar to those shown in FIGS. 7 through 10 are ideally suited for operating at high charging currents since they include portions of solid electrolyte 16 which are not covered with porous electrode 18, thus leaving the solid electrolyte 16 in contact with large open regions between arms or portions of porous electrode 18. This provides direct and unimpeded paths for ionic conduction between all parts of porous electrode 18 and solid electrolyte 16. Thus, at high current, the reaction is not restricted to regions adjacent to solid electrolyte 16. A larger amount of porous electrode area 18 is usable and, in addition, convection in open regions 24 between arms of porous electrode 18 is instrumental in facilitating mass transfer directly to or from the solid electrolyte surface 16 which is substantially surrounded by porous electrode 18. FIG. 7 is a modification of the cell shown in FIG. 3, the modification being made by the addition of four vertical channels 34. FIG. 8 shows a similar modification made to the cell shown in FIG. 6. The cell in FIG. 9 has a thin ring section 18''' made of a foam of porous graphite, which is rigid. In addition to having micropores, the graphite also has macropores 36 which penetrate the whole thickness of the ring and thereby give good contact between solid electrolyte 16 and open regions 24 between arms of porous conductor 18. The cell shown in FIG. 10 has the same advantages as the cell in FIG. 9 except that multiple holes between the solid electrolyte 16 and open region 24 created by open weave space in several layers of graphite cloth. The greater number of arms formed from porous conductor 18 are desired to provide good electrical conductivity to all portions of the thin graphite cloth in this embodiment.

Horizontal cross-sections of a fourth type of tubular cell in accordance with this invention are shown in FIG. 11 and 12. These cells are made of rigidized graphite felt 18 which is most useful for cells in which extreme performance conditions are required. When such a material is employed, convection channels 40 can be machined to give best performance for the particular extreme requirements. Machined holes 40 shown in FIG. 11 may be about 1 mm in diameter or slightly smaller. The holes should be about 2mm separated on center and should be about 1mm on center separated from solid electrolyte surface 16. The cell of FIG. 11 is adapted for utilization at both high charge rate and high discharge rate. In FIG. 12 slot 42 should leave no more than 1mm thickness of felt between it and the solid electrolyte.

A horizontal cross-section of a fifth type of design for energy conversion cells is shown in FIGS. 13–17. These cross-sectional views show multiple tubular array designs suitable for high current, lower voltage batteries. FIG. 13 is merely a representation of any of the previous four cell types repeated to form a linear array, but with the external surface of container 22 changed from cylindrical to rectangular. Thus, for example, any of the cells designs shown in FIGS. 3–12 could be employed in a cell such as shown in FIG. 13. It should be noted that this cell comprises a plurality of tubular solid electrolyte members 16 surrounded by porous electrode material 18, leaving channels or spaces 24 between the porous conductive electrode 18 and cell container 22. FIGS. 14 and 15 show graphite felt designs which are especially easy and economical to construct. The flexible graphite felts are held in place by the pressure of a slight compression between container 22 and solid electrolyte 16. If the cell design is such that a cement such as Dylon is required in order to maintain the porous electrode in place in container 22, difficulty in manufacturing increases. The compression in the preferred embodiment of the cell shown in FIG. 15 is such that one-half to approximately ¾ of solid electrolyte 16 is covered by felt 18. The distance between solid electrolyte tubes 18 is adjusted so that the designated extent of coverage is obtained.

FIG. 16 shows cross-section of a non-planar variation of the type of cell shown in FIG. 13, with several solid electrolyte tubes 16 disposed within cylindrical container 22. Performance of the energy conversion device is improved in accordance with this type of cell by bringing open region space 24 closer to solid electrolyte 16, i.e., surrounding solid electrolyte 16 more by thin regions of porous conductive electrode 18. One significant performance advantage of this design is that open region 24 can be kept in the center of the cell and quite large (high capacity cells) and the solid electrolyte 16 is near the wall, thus permitting low iR drop through the porous electrode current collector arms.

Figure 17:
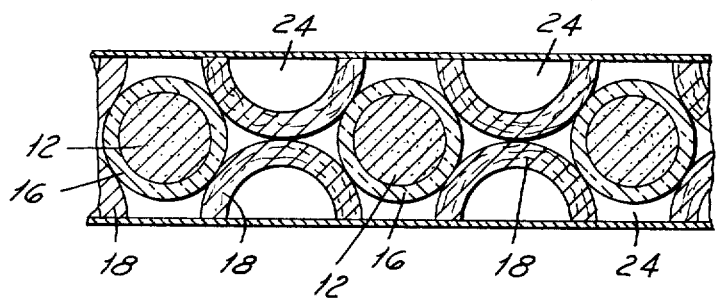

A final variation comprising multiple tube arrays of vertical tube cells is shown in FIG. 17. This design permits increased convection near the ceramic compared to the cell shown in FIG. 14. It is a preferred design for applications requiring high charge rates.

The cell configuration of FIGS. 18 and 19 has been previously discussed in conjunction with FIG. 2. This cell design is useful in some applications in which longer solid electrolyte tubes 16 can be employed and where the compartment in which anodic reaction 12 is disposed can be built so that cells can be stacked horizontally. In this cell substantial convection is normal to the axis of the solid electrolyte rather than parallel to it. For these horizontal cells, convection can be improved by allowing a small gap 24 between the disks of porous electrode 18. The gap may be along the solid electrolyte surface 16 or a thin graphite cloth can be placed around the entire solid electrolyte tube 16 and then the graphite felt disk disposed thereabout in an annular relationship to the solid electrolyte tube 16. The cells of FIGS. 18 and 19 can also be designed as a multiple tube array, with the solid electrolyte tube 16 aligned to form a horizontal array with planar container wall 22. The horizontal tubes can be stacked vertically in planar array with planar container walls 22, or stacked vertically in non-planar array with cylindrical container walls.

Figure 20:
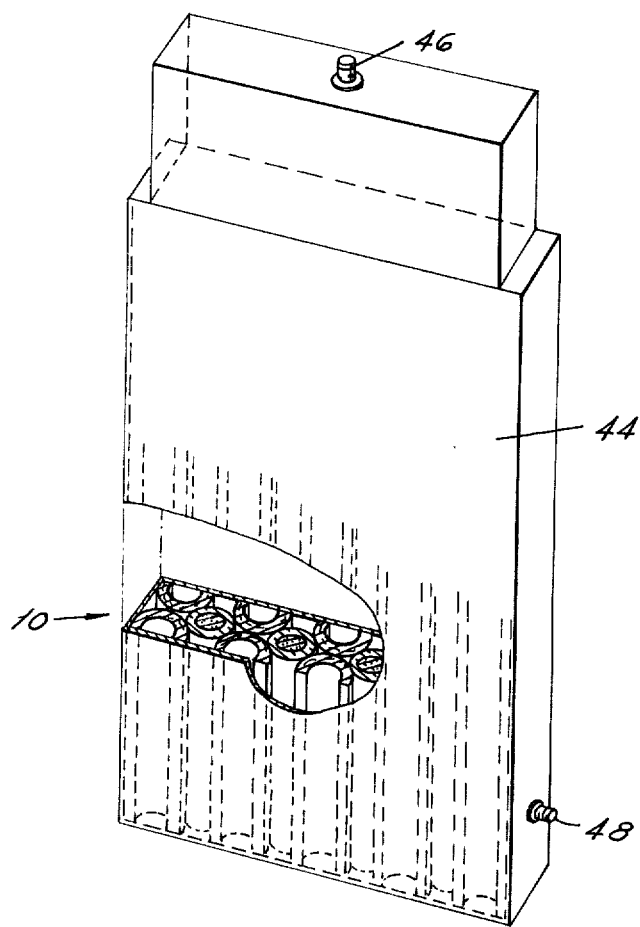
FIG. 20 shows an electrical conversion device comprising a plurality of individual electrical conversion cells.

FIG. 20 is a schematic view of the multiple tube array of FIG. 17 wherein a plurality of cells 10 are disposed within a container 44 and are connected in parallel to form a battery having poles 46 and 48.

Figure 21:
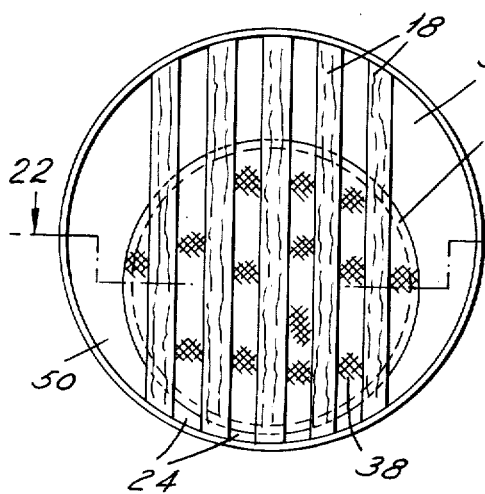
FIGS. 21 and 22 show sectional views of yet another electrical device designed in accordance with the invention.
Figure 22:
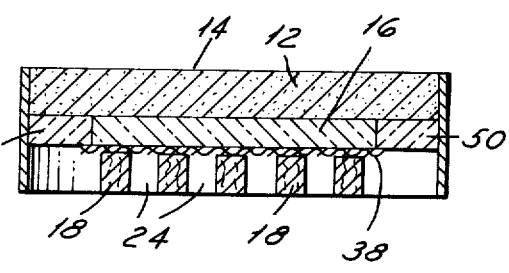

An end view of a final illustrative cell configuration is shown in FIG. 21, and FIG. 22 shows a section of such a cell taken along line 22–22 of FIG. 11. The cell comprises a disk or plate of solid electrolyte material 16 which is interposed between anodic reactant container 14 containing anodic reactant 12 and a cathodic reaction zone including porous conductive electrode 18 and convection promoting spaces 24. The porous conductive electrodes 18 are connected with said solid electrolyte 16 directly or by means of a porous conductive member 38, e.g. graphite cloth. The solid electrolyte 16 may be prepared from beta-alumina ceramic and the material framing the ceramic disk 16 may comprise alpha-alumina 50. Cell types shown in FIGS. 3–12 can be designed as flat plate cells such as shown in FIGS. 21 and 22 by increasing the radius without changing the graphite dimension to any appreciable extent. Thus, imagine the vertical solid electrolyte tubes 16 to be cut along their length and having been opened up and pressed flat. The flat disk must, of course, be positioned vertically to retain all channels in a vertical position.

It will be appreciated that the various cell designs shown in the drawing are merely representative of any number of designs which will fall within the scope of this invention as defined by the claims. Several general comments with respect to the numerous types of cells shown in the drawings and discussed in the specification can be made. First, the number of arms or extensions of porous conductive electrode material 18 in the figures is not limited to any particular number but can vary widely, but perhaps most advantageously within the range of from about 2 to about 16 depending upon the application for which the cell is designed. Second, the solid electrolyte or ceramic tubes 16 generally have an outer diameter of about 1cm but this can vary considerably. Third, the thickness of felt material or porous conducting material 18 surrounding the ceramic, but not extending to the cell wall 22, as in the type of cell shown in FIG. 3A is nominally between about 1 and about 4mm. Fourth, cell container diameters generally vary with the capacity of the cells, but may nominally be between about 2cm and about 8cm. Fifth, most of the convective channels have a minimum dimension of between about 0.5mm and about 1.5mm. Sixth, the dimensions of the graphite or porous conductive electrode material 18 and of the open region 24 can vary in all the cell types from top to bottom in a continuous or discontinuous manner. For example, porous conductive electrodes of two or more types can be alternated in layers along the length of a given solid electrolyte 18. Since a composition gradient may exist from top to bottom in the energy conversion devices, changes in wicking and convection brought about by vertically varying electrode shapes are desired for optimizing charge and discharge performace for high current density applications. Generally, since sulfur congregates at the top of electrolyte and is wicked by graphite, it is expected that the desired distribution of graphite is a function of vertical location in the cell. Seventh, while the various cell designs were prepared using graphite felt or foam, other materials such as stainless steel felt can be used in place of graphite. Eighth, the molten liquid electrolyte which is electrochemically reacted with the anodic reactant may extend beyond the top and bottom of the porous conductive electrode structure 18 in all of the design types discussed in the disclosure. This enhances formation of additional convective loops. Finally, the influence of wicking on mass transport will exist for cells in any orientation. The cells described by FIGS. 1 through 22 operate best when both wicking and free convection enhance mass transport.

It will be obvious to those skilled in the art that modification may be made in the various cells illustrated in the drawings and the details of the foregoing specific discussion in the specification without departing from the scope of the invention as set forth in the appended claims.

We claim:
1. An electrical conversion device comprising:
    1. an anodic reaction zone containing a molten alkali metal reactant-anode in electrical contact with an external circuit;
    2. a cathodic reaction zone containing (a) a liquid cathodic reactant which is electrochemically reactive with said anodic reactant and which, when said device is at least partially discharged, is an electrolyte, and (b) an electrode of porous conductive material which is at least partially immersed in said cathodic reactant; and
    3. a cation-permeable barrier to mass liquid transfer interposed between and in contact with said anodic and cathodic reaction zones, said porous conductive material being in electrical contact with both said cation-permeable barrier and said external electrical circuit;

wherein the improvement comprises a plurality of channels or spaces within said cathodic reaction zone which are free of said porous conductive material and which in combination with said porous conductive material are adapted to allow flow within said cathodic zone of said cathodic reactant and cathodic reaction products during operation of said device, said porous conductive material including a plurality of arms which extend from the vicinity of said barrier to the exterior of said cathodic reaction zone and which make electrical contact with said external circuit, and at least a portion of said channels or spaces being bounded, at least in part, by said arms and the exterior of said cathodic reaction zone and extending at least to within about 1 to about 4 mm. of said barrier.

2. An electrical conversion device in accordance with claim 1, wherein said conductive material is contiguous with the entire surface of said cation-permeable barrier within said cathodic reaction zone.

3. An electrical conversion device in accordance with claim 2, wherein a portion of said channels or spaces are bounded entirely by said porous conductive material.

4. An electrical conversion device in accordance with claim 1, wherein said conductive material is contingous with only a portion of the surface of said cation-permeable barrier within said cathodic reaction zone, such that at least a portion of said channels or spaces extend from the exterior of said cathodic zone to said barrier.

5. An electrical conversion device in accordance with claim 4, wherein said conductive material is intermittently contiguous with said surface of said cation-permeable barrier within said cathodic reaction zone.

6. An electrical conversion device in accordance with claim 4, wherein a portion of said channels or spaces are bounded entirely by said surface of said cation-permeable barrier within said cathodic reaction zone and by said conductive material.

7. An electrical conversion device in accordance with claim 4, wherein at least a portion of said channels or spaces are bounded entirely by said conductive material.

8. An energy conversion device in accordance with claim 1, wherein said device comprises one of said cathodic reaction zones, a plurality of said anodic reaction zones and a plurality of said cation-permeable barriers.

9. An electrical conversion device in accordance with claim 1, wherein the disposition of said conductive material and said channels or spaces within said cathodic reaction zone varies along the cylindrical axis of said device.

10. An electrical conversion device in accordance with claim 1, wherein said conductive material is a porous felt.

11. An electrical conversion device in accordance with claim 1, wherein said conductive material is a porous foam.

12. An electrical conversion device in accordance with claim 1, wherein said device is a primary battery.

13. An electrical conversion device in accordance with claim 1, wherein said liquid electrolyte is electrochemically reversibly reactive with said anodic reactant and said device is a secondary battery.

14. An electrical conversion device comprising:
 1. a tubular container which is in electrical contact with an external electrical circuit;
 2. a tubular cation-permeable barrier to mass liquid transfer which is disposed within said tubular container so as to create an anodic reaction zone within said tubular barrier and a cathodic reaction zone between said tubular barrier and said tubular container;
 3. a molten alkali metal anodic reactant within said anodic reaction zone and in electrical contact with said external electrical circuit;
 4. a liquid cathodic reactant which is electrochemically reactive with said anodic reactant which, when said device is at least partially discharged, is an electrolyte, and which is disposed within said cathodic reaction zone; and
 5. an electrode of porous conductive material which is disposed within said cathodic reaction zone, immersed at least in part in said cathodic reactant and is in both electrical and physical contact with both said tubular barrier and said container, wherein the improvement comprises a plurality of channels or spaces within said cathodic reaction zone which are free of said porous conductive material and which are adapted to allow free flow therethrough of said cathodic reactans and cathodic reaction products during operation of said device, said porous conductive material including a plurality of arms which extend from the vicinity of said barrier to the exterior of said cathodic reaction zone and which make electrical contact with said external circuit, and at least a portion of said channels or spaces being bounded, at least in part, by said arms and the exterior of said cathodic reaction zone and extending at least to within about 1 to about 4 mm. of said barrier.

15. An electrical conversion device in accordance with claim 14, wherein a horizontal cross-section of said device has the configuration shown in FIG. 3.

16. An electrical conversion device in accordance with claim 14, wherein a horizontal cross-section of said device has the configuration shown in FIG. 4.

17. An electrical conversion device in accordance with claim 14, wherein a horizontal cross-section of said device has the configuration shown in FIG. 5.

18. An electrical conversion device in accordance with claim 14, wherein a horizontal cross-section of said device has the configuration shown in FIG. 6.

19. An electrical conversion device in accordance with claim 14, wherein a horizontal cross-section of said device has the configuration shown in FIG. 7.

20. An electrical conversion device in accordance with claim 14, wherein a horizontal cross-section of said device has the configuration shown in FIG. 8.

21. An electrical conversion device in accordance with claim 14, wherein a horizontal cross-section of said device has the configuration shown in FIG. 5C.

22. An electrical conversion device in accordance with claim 14, wherein a horizontal cross-section of said device has the configuration shown in FIG. 10.

23. An electrical conversion device in accordance with claim 14, wherein a horizontal cross-section of said device has the configuration shown in FIG. 11.

24. An electrical conversion device in accordance with claim 14, wherein a horizontal cross-section of said device has the configuration shown in FIG. 12.

25. An electrical conversion device in accordance with claim 14, wherein said device includes a plurality of said tubular barriers and a plurality of anodic reaction zones.

26. An electrical conversion device in accordance with claim 25, wherein a horizontal cross-section of said device has the configuration shown in FIG. 13.

27. An electrical conversion device in accordance with claim 25, wherein a horizontal cross-section of said device has the configuration shown in FIG. 14.

28. An electrical conversion device in accordance with claim 25, wherein a horizontal cross-section of said device has the configuration shown in FIG. 16.

29. An electrical conversion device in accordance with claim 25, wherein a horizontal cross-section of said device has the configuration shown in FIG. 17.

30. An electrical conversion device in accordance with claim 14, wherein the cross-sectional configuration of said conductive material and said channels or spaces varies along the cylindrical axis of said device.

31. An electrical conversion device in accordance with claim 14, wherein said device is a primary battery.

32. An electrical conversion device in accordance with claim 14, wherein said liquid electrolyte is electrochemically reversibly reactive with said anodic reactant and wherein said device is a secondary battery.

33. An electrical conversion device comprising a plurality of devices as claimed in claim 1 which are electrically connected in an array to form a battery.

34. An electrical conversion device comprising a plurality of the devices as claimed in claim 14 electrically connected in an array to form a battery.

35. An electrical conversion device in accordance with claim 1, wherein said cation-permeable barrier is a plate or disc and said conductive material is disposed at right angles thereto so as to form flow channels therebetween.

36. An electrical conversion device in accordance with claim 1 wherein: said channels or spaces are elongated volumes having a principal axis in the elongated direction, said elongated channels being orientated so that the principal axis thereof is aligned generally with the gravitational field in which the electrical conversion device is operating.

37. An electrical conversion device in accordance with claim 14, wherein said porous conductive material is contiguous with the entire surface of said cation-permeable barrier within said cathodic reaction zone.

38. An electrical conversion device in accordance with claim 37, wherein a portion of said channels or spaces are bounded entirely by said porous conductive material.

39. An electrical conversion device in accordance with claim 14, wherein said conductive material is contiguous with only a portion of the surface of said cation-permeable barrier within said cathodic reaction zone, such that at least a portion of said channels or spaces extend from the exterior of said cathodic reaction zone to said barrier.

40. An electrical conversion device in accordance with claim 39, wherein said conductive material is intermittently contiguous with said surface of said cation-permeable barrier within said cathodic reaction zone.

41. An electrical conversion device in accordance with claim 39, wherein a portion of said channels or spaces are bounded entirely by said surface of said cation-permeable barrier within said cathodic reaction zone and by said conductive material.

42. An electrical conversion device in accordance with claim 39, wherein at least a portion of said channels or spaces are bounded entirely by said conductive material.

43. An electrical conversion device in accordance with claim 14, wherein said conductive material is a porous felt.

44. An electrical conversion device in accordance with claim 14, wherein said conductive material is a porous foam.

* * * * *